May 30, 1961 N. G. PETERSEN 2,986,316
REGISTER MEANS FOR KINETOSCOPES
Filed June 23, 1958 2 Sheets-Sheet 1
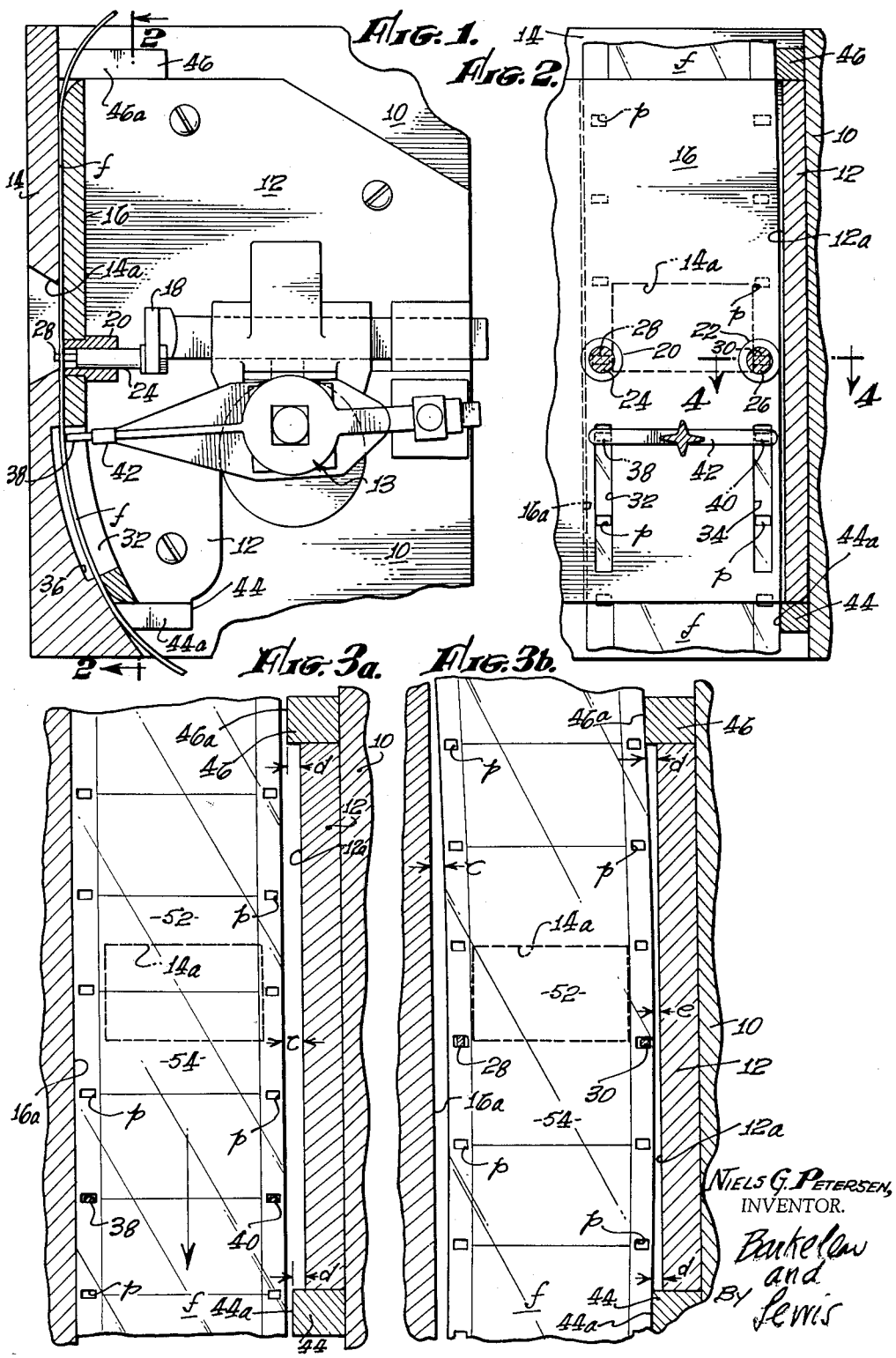
NIELS G. PETERSEN,
INVENTOR.
By Buckelew
and
Lewis

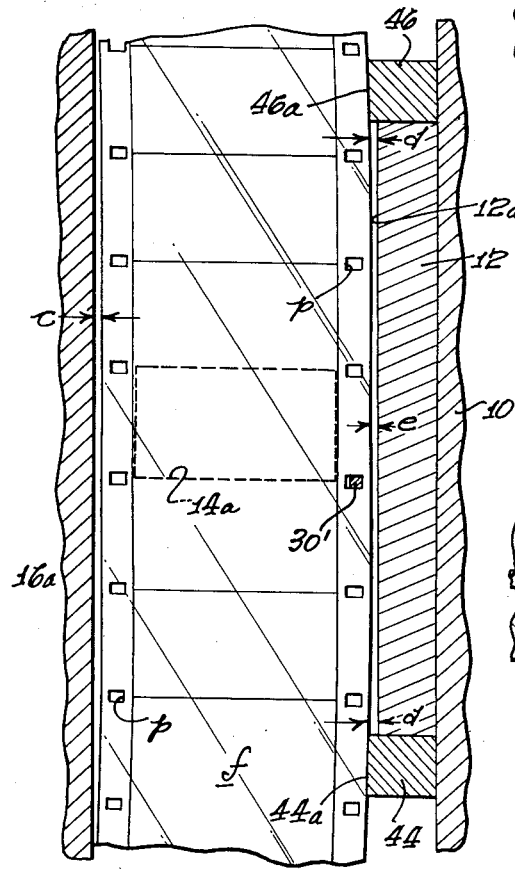
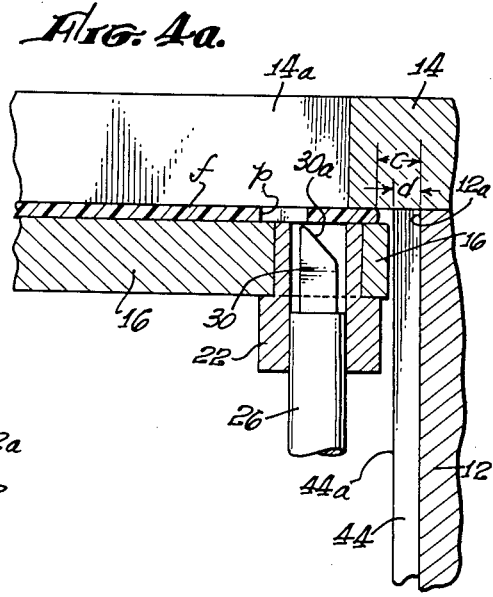
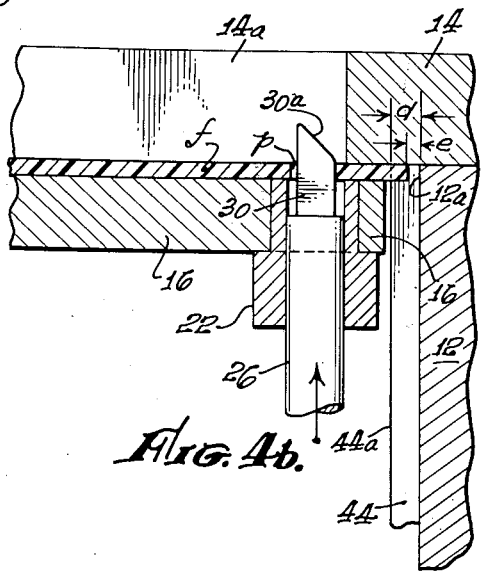

United States Patent Office 2,986,316
Patented May 30, 1961

2,986,316
REGISTER MEANS FOR KINETOSCOPES
Niels G. Petersen, Palm Springs, Calif., assignor to Mitchell Camera Corporation, Glendale, Calif., a corporation of Delaware
Filed June 23, 1958, Ser. No. 743,707
3 Claims. (Cl. 226—57)

This invention relates to register means useful in the intermittent mechanism of kinetoscopes to align film frames in relation to the kinetoscope aperture. The invention is characterized by novel means utilizing an edge of the film as an alignment reference and operating in conjunction with register pins, and is particularly useful in applications where highly accurate alignment is required. The invention is also characterized by extreme simplicity of structure, and is furthermore easily adaptable for use in kinetoscopes employing prior art register means.

In the prior art, film frames were aligned and held relative to a kinetoscope aperture by register pins near the aperture which entered and fitted snugly within perforations in the film. The register pins were rigidly aligned relative to the horizontal and vertical axis of the aperture, and were tapered to allow entry into the perforations when the film was misaligned. After entering the perforations, the pins, due to their snug fit in the perforations and rigid relation to the aperture, moved the film into alignment. It should be noted at this point that there are three distinct types of frame misalignment: horizontal linear misalignment, which is a displacement of the frame position along the horizontal axis of the aperture; vertical linear misalignment, which is a displacement of the frame position along the vertical axis of the aperture; and angular misalignment, which is a tilting of either axis of the frame relative to the corresponding axis of the aperture. The prior art devices generally employed two register pins which engaged perforations flanking the frame to be aligned. One pin fitted snugly within all four boundaries of its perforation, and the other fitted snugly in the vertical dimension only in its perforation. The horizontal alignment was set by the one pin engaging all four perforation boundaries, and the vertical and angular alignments were set by the combination of the two pins each engaging its perforation in the vertical dimension. Thus in the prior art devices the accuracy of alignment depended on both the accuracy of the pins and of the perforations. And since register pin inaccuracies could be made quite small relative to perforation inaccuracies, the accuracy of alignment depended primarily on the accuracy of the perforations. The accuracy of the perforations, however, is not a fixed quantity; it varies with film perforating tolerance, temperature, humidity, age, and wear of the perforations by the register pins and sprockets in the kinetoscope. In addition, the film sometimes must be cut and spliced in many places, thus introducing additional inaccuracy in the perforations.

Therefore, in applications requiring a high degree of accuracy in film alignment, the register means previously known in the art have been found to have serious drawbacks. One particularly troublesome drawback has been angular misalignment of the film due to perforation inaccuracies, which was manifested as a tilting of the frame relative to the aperture. In standard practice the film perforations are punched to a tolerance of ±0.0004 inch both as to pitch and hole size. Thus, a clearance of 0.0005 between pin and hole edge is easily possible. Then, if such a clearance takes place above the pin at one edge and below that at the other edge, it is possible for the film to be tilted up at one edge and down at the other edge by such an amount. The total tilt across the width of the film will then be 0.001 inch. Such film tilting may also be caused by inaccuracy of transverse alignment of a pair of perforations; but the most common cause is as above stated.

One important object of this invention is to eliminate such angular misalignment by providing register means which operate on a novel principle, and which, by virtue of its novel mode of operation, renders angular alignment of the frame substantially independent of perforation inaccuracies. Furthermore, the invention is extremely simple in structure, and may be readily and easily incorporated into kinetoscopes employing prior art register mechanisms. Additional objects and advantages of the invention will be apparent to those skilled in the art from the following description of one illustrative embodiment thereof, in connection with the attached drawings, in which:

Fig. 1 is an elevational section of a typical kinetoscope intermittent mechanism employing the invention;

Fig. 2 is a section taken on the line 2—2 of Fig. 1;

Fig. 3a is a schematic of the invention showing the pull-down claws engaged in the film perforations;

Fig. 3b is the schematic showing the register pins engaged in the film perforations;

Fig. 3c is a schematic similar to Fig. 3b, showing a modification;

Fig. 4a is an enlarged section taken on the line 4—4 of Fig. 2 showing a register pin withdrawn from the film perforations;

Fig. 4b is a similar section taken on the line 4—4 of Fig. 2 showing a register pin engaged in a film perforation.

The invention is applicable to any kinetograph mechanism and a typical old structure will be first described in connection with Figs. 1 and 2. Referring to those figures a base plate 10 supports a register plate 12, an aperture plate 14 with an aperture 14a, a back plate 16, and an intermittent mechanism generally indicated at 13. Film f having perforations p fits with clearance in a film race comprising the space bounded by aperture plate 14, back plate 16, an edge surface such as 12a of the register plate on one side and an opposing edge surface such as 16a of the back plate on the other side. Register pins 28 and 30 extend through back plate 16 near the bottom corners of the aperture 14a. The register pins are supported on shafts 24 and 26, which are slidable in bushings 20 and 22 mounted in the back plate, and connected together by a cross member 18, which is connected to the intermittent mechanism 13. Below the register pins two pull-down claws 38 and 40 project through slots 32 and 34 cut in plate 16, and, when inserted through the perforations p, into recesses cut into the aperture plate behind the slot; claw 38 into recess 36, and claw 40 into a similar recess not shown. The intermittent 13 may be of any suitable type adapted for use with register pins. The structure of specific type here disclosed is fully described in Patent No. 1,850,411, issued March 22, 1932, for a Film Movement.

The function of the intermittent mechanism will be now illustrated by describing one complete cycle thereof, beginning with the state shown in Fig. 1, where the film is held stationary and aligned relative to the aperture by the register pins engaged in the perforations. The time during which the film is held stationary will hereinafter be referred to as dwell time. A shutter mechanism, not shown, operates in synchronism with the intermittent mechanism to open the aperture to the kinetoscope optical elements during dwell time and to close the aperture when the film is moved. Therefore, in the state illustrated in Fig. 1 the shutter would be open. When dwell time ends, the shutter closes, and the intermittent mechanism 13 begins to withdraw the register pins from the perforations while at the same time moving the pull-down claws into their opposing film perforations. This action is synchronized so that the pull-down claws enter the film perforations slightly before the register pins have completely withdrawn. After the register pins are withdrawn the pull-down claws continue to move forward, extending through the perforations into the opposing recesses in the aperture plate. Then the claws are swung downward on an arc corresponding to the curvature of the aperature plate and back plate, travelling down the slots 32 and 34 and moving the film downward. The downward movement ends when the film has been moved downward one frame, i.e., a distance (in the standard 16 mm. film) equal to the distance between perforations. When the downward movement ends, another pair of perforations are opposite the register pins, which are tapered so as to be able to enter those perforations in spite of any small misalignment of the film. It will be understood that the amount of horizontal misalignment will be limited by the clearance between the film and its edge guides 12a and 16a, and that the vertical misalignment will be limited by the accuracy of the total downward movement of the pull-down claws and the vertical accuracy of the perforations. Normally neither of these extremes of misalignment is sufficient to block easy entry of the register pins. So, at the end of the downward movement, the pull-down claws are withdrawn from the perforations and the register pins inserted; the register pins entering slightly before the pull-down claws are completely withdrawn. The register pins move through the perforations; and, by bearing on the sides of the perforations, bring the film into alignment relative to the aperture. The pull-down claws, then withdrawn completely, swing upward toward the position shown in Fig. 1, and the shutter is opened to expose the frame of film in front of the aperture. The frame is then exposed during dwell time, and at the end of dwell time the cycle described above is repeated.

The structure and operation as thus far described are old, and it should be understood that the specific nature of the intermittent mechanism and film support means are disclosed here for illustrative purposes only, their structure being generally immaterial to the operation of the invention.

The inventive portions of the structure, broadly described, include two vertically spaced alignment surfaces, here shown as provided by blocks one above and one below the aperture, each having an alignment surface adjacent to an edge of the film. The blocks are rigidly mounted with respect to the aperture and aligned vertically such that a line drawn between the two alignment surfaces is parallel with the vertical axis of the aperture. A register pin located between the two alignment blocks is adapted to enter a film perforation and to bear laterally thereon to move the film edge between the blocks toward and preferably slightly beyond the vertical line defined by the alignment surfaces.

Referring to Figs. 1 and 2 alignment blocks 44 and 46 having alignment surfaces 44a and 46a are rigidly mounted on base plate 10, which is rigid relative to aperture plate 14. The blocks project laterally beyond the edge guide surface 12a, and a line drawn between alignment surfaces 44a and 46a is parallel with the vertical axis of aperture 14a. Register pin 30 is adapted to enter the perforations p in the film f and to press the film edge against alignment surfaces 44a and 46a without bringing the film edge into contact with guide surface 12a. It should be understood that the specific location of the alignment blocks is not essential as long as they are spaced above and below the register pin with their alignment surfaces in rigid parallel relation with the vertical axis of the aperture. The alignment blocks might, for example, alternately comprise two projections formed in guide surface 12a above and below pin 30. The specific mounting here disclosed, however, has the advantage of being easily adaptable to existing kinetoscopes.

The operation of the invention will now be described in connection with schematic drawings 3a and 3b, in which the clearance d between the alignment surfaces 44a and 46a and the guide surface 12a is exaggerated, as is the clearance c between the film and the guide surfaces 12a and 16a. Fig. 3a shows the film during downward movement, with pull-down claws 38 and 40 engaged in perforations and moving downward. The pull-down claws are normally smaller in every dimension than the perforations, as shown. Frame 54 has been exposed during the immediately preceding dwell time, and the pull-down action will end when frame 52 is positioned over the aperture 14a. The film f is shown in maximum horizontal misalignment for purposes of explanation only, it might be located anywhere between guide 16a and the alignment surfaces, so long as the clearance therebetween is less than the clearance between the pull-down claws and the perforations. In the latter case the horizontal misalignment would be limited by the pull-down claws. When frame 52 is positioned over the aperture, the pull-down action stops, the pull-down claws withdraw, and register pins 28 and 30 move into the perforations and force the film into alignment, as shown in Fig. 3b.

Referring to Fig. 3b, register pin 28 bears on the edges of the perforation in its vertical dimension, but not in its horizontal dimension. It should be noted here that pin 28, by itself, is identical with corresponding prior art register pins. Pin 30, however, differs radically from its corresponding prior art counterpart. In the prior art register pins such as pin 30 were designed to bear on the perforation in both the horizontal and vertical dimensions. In this typical form of the invention, the register pin 30 bears only horizontally on the boundary of the perforation adjacent the alignment surfaces 44a and 46a, and it moves the film edge a small distance, preferably slightly beyond the line defined by the alignment surfaces without pressing it against guide surface 12a. In Figs. 3a and 3b, for example, the dimension d is in the order 0.002 inch, the dimension c in the order of 0.003 inch, and the dimension e in the order of 0.001 inch. Thus in this invention the film is aligned horizontally and angularly by having its edge slightly bent between two vertically spaced alignment surfaces which are accurately aligned relative to the film race and the aperture. That amount of normal bend of the film insures that the edge of the film will always contact surfaces 44a and 46a, in spite of slight inaccuracies in the perforations. Surfaces 44a and 46a are preferably spaced rather widely, for example in a 16 mm. machine the spacing may be of the order of four inches; so that the normal bend in the film is very slight. As here illustrated it is of the order of 0.001 inch in four inches.

The vertical positioning may be effected by having a single pin bear on its perforation in the vertical dimension. For example, in Fig. 3b pin 28 is shown closely fitting the perforation vertically, while pin 30 fits loosely vertically. In that arrangement, pin 28 positions the film vertically, while pin 30 positions it horizontally. On the other hand pin 30 may fit the perforation closely vertically, and then both pins position the film vertically. But if pin 30 fits closely vertically, pin 28 may be omitted, as pin 30 positions the film both vertically and horizontally. Such an arrangement is shown for pin 30' in Fig. 3c. Whether or not two pins, or a single pin, are used, the vertical position of the film is fixed by one pin, and the vertical alignment fixed by one pin.

The structure and operation of register pin 30 is disclosed in Figs. 4a and 4b. In Fig. 4a the film is shown in its maximum horizontal displacement, as in Fig. 3a.

The clearance $d$ between the lower alignment surface 44a and guide edge 12a is the same as in Fig. 3a, as is the clearance $c$ between the film edge and guide edge 12a. The register pin 30 is tapered as shown at 30a to allow entry in the perforation $p$ under conditions of maximum film displacement. When pin 30 is moved into the perforation $p$ it bears on the right hand edge of the perforation, forcing the film edge beyond the plane of alignment surfaces 44a and 46a, as shown in Fig. 4b for surface 44a. When fully inserted in the perforation, a clearance $e$ remains between the film edge and guide edge 12a.

Thus it can be seen that by providing a novel means for aligning the film, this invention acts to eliminate tilting of the frame due to inaccuracies in the film perforations, thus rendering the angular alignment of the film substantially independent of perforation inaccuracies. It can also be seen that the invention is extremely simple in structure, and can be easily adapted to kinetoscopes employing prior art register means. And although this invention has been illustrated by reference to one specific embodiment thereof, it is by no means limited to that specific embodiment. Many modifications are possible in the structure disclosed which do not depart from the spirit of the invention. This invention includes all such modifications falling within the scope of the following claims.

I claim:

1. In kinetoscope mechanism having structure forming a longitudinally extending film race of flat foundation adapted to take an elongate film strip having longitudinally spaced perforations, and film moving means adapted to move such film intermittently longitudinally through the film race; improved film registration means comprising, in combination, edge structure for the film race including two film-edge alignment surfaces located in a longitudinal plane which is substantially normal to the plane of the film race, said alignment surfaces being each of limited longitudinal extent and spaced apart longitudinally along one longitudinal edge of the film race, said alignment surfaces being rigid relative to said one edge of the film race and being located on a line substantially parallel to the film race and spaced inwardly toward the opposite edge of the film race beyond film race structure between them so that a film with its edge in contact with the two spaced alignment surfaces will not contact edge structure between them, and a registration pin located spacedly between the two alignment surfaces and movable into and out of film perforations, in synchronism with the film moving means, along a line of movement substantially normal to and fixed with relation to the film race, said registration pin having a surface on its side toward said race edge lying in a longitudinal plane at an acute angle to said line of movement, whereby the register pin upon entry into a film perforation moves said edge of the film, at the points longitudinally adjacent the spaced alignment surfaces, toward and at least as far as the location plane of the two spaced alignment surfaces to move that edge of the film against both said alignment surfaces.

2. The combination defined in claim 1, and also including a second register pin movable into and out of perforations in film contained in the film race, in synchronization with the film moving means, along a line of movement fixed with respect to the structure forming the film race, said second register pin adapted to fit snugly within the longitudinal dimension and loosely within the transverse dimension of a perforation when moved thereinto and the first mentioned register pin being adapted to fit with clearance within the longitudinal dimension of a perforation when moved thereinto.

3. The combination defined in claim 1, wherein the register pin is adapted to fit snugly within the longitudinal dimension of a perforation when moved thereinto.

References Cited in the file of this patent

UNITED STATES PATENTS

| | | |
|---|---|---|
| 691,493 | Rosenberg | Jan. 21, 1902 |
| 740,318 | Scherf | Sept. 29, 1903 |
| 955,189 | Nesemann | Apr. 19, 1910 |
| 1,262,255 | Rector | Apr. 9, 1918 |
| 1,845,062 | Schustek et al. | Feb. 16, 1932 |
| 1,954,885 | Mitchell et al. | Apr. 17, 1934 |
| 1,955,160 | Wright | Apr. 17, 1934 |
| 2,431,254 | Jacobson | Nov. 18, 1947 |

FOREIGN PATENTS

| | | |
|---|---|---|
| 1,037,041 | France | Apr. 29, 1953 |
| 492,194 | Germany | Feb. 19, 1930 |